United States Patent [19]

Kliger

[11] 4,380,483
[45] Apr. 19, 1983

[54] PROCESS FOR FORMING IMPROVED CARBON FIBER REINFORCED COMPOSITE COIL SPRING

[75] Inventor: Howard S. Kliger, Edison, N.J.

[73] Assignee: Celanese Corporation, New York, N.Y.

[21] Appl. No.: 190,339

[22] Filed: Sep. 24, 1980

Related U.S. Application Data

[62] Division of Ser. No. 3,671, Jan. 15, 1979, Pat. No. 4,260,143.

[51] Int. Cl.³ .................. B65H 81/00; F16F 1/04
[52] U.S. Cl. ........................ 156/169; 156/180; 156/245; 264/257; 428/375
[58] Field of Search ............. 156/166, 169, 172, 173, 156/175, 195, 149, 245; 264/257, 258, 137, 103; 428/375, 377

[56] References Cited

U.S. PATENT DOCUMENTS

| | | | |
|---|---|---|---|
| 2,829,881 | 4/1958 | Morris | 267/149 |
| 2,852,424 | 9/1958 | Reinhart et al. | 267/149 |
| 2,913,240 | 11/1959 | Mohr | 267/1 |
| 3,143,306 | 8/1964 | Dijkmans et al. | 156/175 |
| 3,449,198 | 6/1969 | Mead | 267/166 |
| 3,560,065 | 2/1971 | Shobert et al. | 156/173 |
| 3,691,000 | 9/1972 | Kalnin | 428/114 |
| 4,326,905 | 4/1982 | Nanaka | 156/149 |

FOREIGN PATENT DOCUMENTS

| | | | |
|---|---|---|---|
| 223965 | 1/1959 | Australia | 267/149 |
| 946005 | 4/1974 | Canada | 267/149 |
| 2334971 | 1/1975 | Fed. Rep. of Germany | |
| 85331 | 1/1955 | France | |
| 1492023 | 11/1965 | France | |
| 2103110 | 4/1972 | France | |
| 34161 | 3/1977 | Japan | 267/149 |

*Primary Examiner*—Michael W. Ball
*Attorney, Agent, or Firm*—Burns, Doane, Swecker & Mathis

[57] ABSTRACT

A carbon fiber reinforced composite coil spring is provided which is made from a braid formed of carbon fibers oriented at a preferred angle to the braid axis of approximately plus or minus 45° and impregnated with a resin which serves as a substantially continuous matrix phase. Longitudinal reinforcing fiber may be incorporated into the braid to prevent it from straightening under longitudinal tension. The carbon fiber reinforced composite coil spring is formed by wrapping the braid, impregnated with a non-solidified resin, within a groove which extends helically along the surface of a helical mandrel and solidifying the resinous matrix material, and then removing the solid composite coil spring from the helical mandrel.

12 Claims, 11 Drawing Figures

PROCESS FOR FORMING IMPROVED CARBON FIBER REINFORCED COMPOSITE COIL SPRING

This is a division of application Ser. No. 3,671, filed Jan. 15, 1979 now U.S. Pat. No. 4,260,143.

BACKGROUND OF THE INVENTION

The present invention relates to a carbon fiber reinforced composite coil spring and the method of making it.

Coil springs have a myriad of uses in all kinds of machinery. They have a number of uses in the automotive industry for vehicle suspension systems and in various parts of the engine (e.g., valve lifter springs). The automotive industry has recently been attempting to reduce vehicle weight in order to lower costs and provide decreased fuel consumption. The substitution of light weight materials (e.g., plastics) for the heavy metals commonly used in automobile parts (e.g., grillwork) is currently one method used to decrease vehicle weight. It would thus be desirable to employ coil springs within automobiles which are comprised of a material which is lighter than the metal currently used in coil springs yet has nearly the same strength and energy storage characteristics.

Metal coil springs are also used within multitudes of industrial machines such as conveyors, compactors, hammers, etc. However, the vibratory capacity and endurance of the metal springs limit the length of time and frequency during which these machines can be operated without requiring replacement of the metal coil springs due to fatigue failure. Fatigue failure occurs in parts which are subjected to continuingly varying stresses, for example, coil springs. The use of a non-metallic material in such springs which could better withstand the repeated vibratory forces is thus highly desirable.

Fiber-reinforced plastic springs have long been known as substitutes for metallic springs, including metallic coil springs. For example, U.S. Pat. Nos. 2,852,424 and 3,378,426 each disclose glass fiber-reinforced plastic coil springs. U.S. Pat. No. 3,142,598 discloses resin-impregnated glass fiber-reinforced automobile leaf springs. In addition, U.S. Pat. No. 3,321,200 discloses a glass fiber-reinforced plastic bellows spring which may be used in vehicle suspension systems. While the use of such glass fiber-reinforced plastic springs provides a low weight substitute for metal springs, the strength of the spring is generally not as high as a comparably sized metal spring. One reason behind the lower strength of fiber-reinforced plastic springs is that randomly oriented non-associated fibers are generally used as the reinforcing medium. Such randomly oriented non-associated or individual fibers have low shear strength and low shear modulus.

It is thus an object of this invention to provide an improved lightweight, fiber-reinforced coil spring.

It is also an object of this invention to provide a carbon fiber-reinforced composite coil spring which exhibits high strength in relation to its weight.

It is further an object of this invention to provide a composite coil spring comprised of resin-impregnated carbon fiber braid which exhibits durability in relation to its weight.

It is yet another object of this invention to provide a method for forming an improved carbon fiber-reinforced composite coil spring.

SUMMARY OF THE INVENTION

The foregoing and other objects of this invention, it has been discovered, may be attained by a carbon fiber reinforced composite coil spring comprising a coil spring structure formed of braided carbon fibers and a quantity of resin serving as a substantially continuous matrix material for said braided fibers, said carbon fibers being braided at an angle of approximately plus or minus 30° to plus or minus 60° to the braid axis.

In addition, still other objects of this invention may be attained by a method of forming the carbon fiber reinforced composite coil spring of this invention comprising impregnating a carbon fiber braid wherein fibers are oriented at an angle of plus or minus 30° to plus or minus 60° to the braid axis with a quantity of non-solidified resin to serve as a substantially continuous matrix material, winding said impregnated braid within a groove which extends helically along the surface of a cylindrical mandrel to provide the coil configuration of said fiber reinforced composite coil spring, solidifying the resinous matrix material, and removing said solid spring from said mandrel.

DESCRIPTION OF PREFERRED EMBODIMENTS

The carbon fiber reinforced composite coil spring of this invention comprises a coil spring structure formed of braided carbon fibers and a quantity of resin serving as a substantially continuous solid matrix material for said braided fiber. The carbon fibers are braided at an angle of approximately plus or minus 30° to plus or minus 60° to the braid axis. A longitudinal reinforcing fiber may also be incorporated into the braid.

A more detailed understanding of the invention may be obtained by reference to the illustrated embodiments as depicted by the drawings of FIGS. 1–11.

Figure 1:
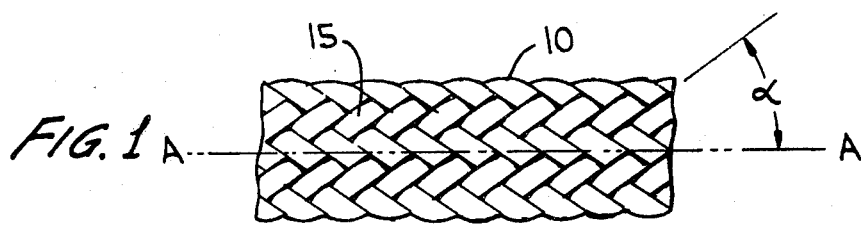
FIG. 1 shows a portion of the carbon fiber braid used to form the composite coil spring of this invention.

FIG. 1 depicts a portion of the carbon fiber braid 10 formed of carbon fibers 15 and which is used to make the composite coil spring of the present invention. The carbon fibers 15 are oriented at an angle alpha to the braid axis AA in the range of approximately plus or minus 30° to plus or minus 60°. Preferably the carbon fibers are oriented at an angle alpha in the range of approximately plus or minus 45° to the braid axis.

The term "carbon" fibers is used herein in the generic sense and is intended to include graphite fibers as well as amorphous carbon fibers. Graphite fibers are defined herein as fibers which contain at least about 90 percent carbon by weight and have a predominant X-ray diffraction pattern characteristic of graphite. In a preferred embodiment the graphite fibers contain at least about 95 percent carbon by weight, and most preferably at least about 99 percent carbon by weight.

Amorphous carbon fibers, on the other hand, are defined as fibers in which the bulk of the fiber weight can be attributed to carbon and which exhibits an essentially amorphous X-ray diffraction pattern.

Such carbon fibers commonly are available as a multifilament bundle of substantially parallel continuous filaments and possess a tenacity of at least 150,000 psi (e.g., 200,000 to 350,000 psi). Additionally, such filaments commonly possess a denier per filament of approximately 0.5 to 2 and a Young's modulus of elasticity of at least 25 million psi (e.g., approximately 25 to 100 million psi). The Young's modulus of elasticity can be determined in accordance with the procedure of ASTM D-2101-64T.

Such carbon fibers are commercially available and may be formed by known techniques by the thermal treatment of a variety of polymeric fibrous materials. Preferred carbon fibers are derived from an acrylic precursor. See, for instance, commonly assigned U.S. Pat. No. 3,775,520; 3,900,556; and 3,954,950 which are herein incorporated by reference.

The carbon fibers are preferably also surface treated following formation to improve their adherence to a resinous matrix material. Representative techniques for modifying the surface characteristics of a carbonaceous fibrous material to improve adhesion to a resinous matrix material are disclosed in commonly assigned U.S. Pat. Nos. 3,723,150; 3,723,607; 3,745,104; 3,762,941; 3,767,774; 3,821,013; 3,894,884; and 3,859,187, which are herein incorporated by reference.

Exemplary carbon fibers which may be employed within the carbon fiber braid are commercially available from Celanese Corporation under the trade designation Celion ® and comprise intermediate modulus, high strength carbon fibers.

Graphitic fibers have among the best properties of any fiber for use as high strength reinforcement. Among the desirable properties of graphite fibers are corrosion and high temperature resistance, low density, high tensile strength, and a high Young's modulus of elasticity. Graphite is one of the few known materials whose tensile strength increases with temperature. Graphite fibers generally have a higher composite shear modulus than amorphous carbon fibers, and thus graphite carbon fibers are preferred for use in the carbon fiber reinforced composite coil spring of this invention.

Coil springs resist the application of a load by torque. The best torque configuration for fiber reinforcement is plus or minus 45°, at which point the highest shear modulus and the highest strength will be exhibited by the coil spring. Accordingly, the use of braided carbon fibers allows for the fibers to be positioned in the range of plus or minus 30° to plus or minus 60° to the braid axis, preferably plus or minus 45° to the braid axis.

The carbon fiber braid may be either flat or circular as long as the required carbon fiber orientation to the braid axis is maintained. Generally the carbon fiber braid will comprise braided multifilament yarn in order to facilitate the braiding procedure, and a yarn of any braidable dimension is suitable for the purpose of this invention.

Figure 2:
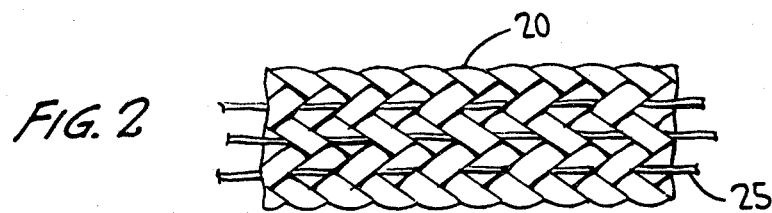
FIG. 2 shows a longitudinally reinforced portion of the carbon fiber braid used to form the composite coil spring of this invention.

FIG. 2 illustrates a longitudinal fiber-reinforced carbon fiber braid 20 which may be used to make the composite coil spring of the present invention. Longitudinal reinforcing fibers 25 may advantageously be incorporated within the braid 20 and oriented longitudinally to the braid axis. The longitudinal reinforcing fibers reduce the possibility of the braid 20 straightening when tension is applied to the braid as it is wound around the helical mandrel. Thus changes in the angle of the carbon fiber orientation within the braid during the application of tension are minimized.

Many types of reinforcing fiber are suitable for use within the carbon fiber braid. Exemplary fibers include glass fibers, carbon fibers, wholly aromatic polyamide fibers (i.e., aramid fibers), polyester fibers, and natural fibers (e.g., cotton fibers). Mixtures of different types of reinforcing fibers may also be employed. Any amount of longitudinal reinforcing fiber which will serve to prevent the braid from straightening under tension in a longitudinal direction may be incorporated into the braid. Typically, from 5 to 10 percent by volume of the carbon fiber reinforced composite coil spring may be comprised of longitudinal reinforcing fibers. Any method of incorporation of the fibers into the braid is suitable as long as the method of incorporation allows the added reinforcing fiber to reduce the tendency of the carbon fiber braid to straighten in a longitudinal direction as it is wound upon the helical mandrel. For example, the longitudinal reinforcing fiber may be woven into the carbon fiber braid by any known weaving means during the formation of the carbon fiber braid.

Glass fibers are available as multifilament bundles of substantially parallel continuous filaments and commonly possess a Young's modulus of elasticity of 8 to 12 million psi. Representative glass fibers which may be utilized are commercially available under the trade designation of "E-glass" and "S-glass".

Figure 3:
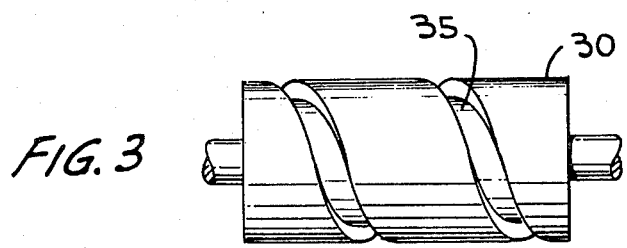
FIG. 3 shows an elevational view of a helical mandrel which may be used to form the composite coil spring.

FIG. 3 shows an elevational view of a helical mandrel 30 which may be used in the formation of the composite coil spring of this invention. The mandrel 30 is provided with a helical groove 35 within the outer surface of the mandrel. Resin-impregnated braid is wound within the helical groove 35 and the resin is allowed to solidify, after which the solid composite coil spring is separated from the mandrel 30.

Figure 4:
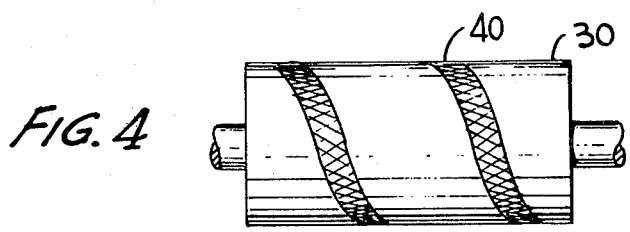
FIG. 4 shows an elevational view of a helical mandrel whose helical groove contains a resin-impregnated carbon fiber braid.

FIG. 4 shows an elevational view of a helical mandrel 30 within whose helical groove a resin-impregnated carbon fiber braid 40 has been placed.

Figure 5:
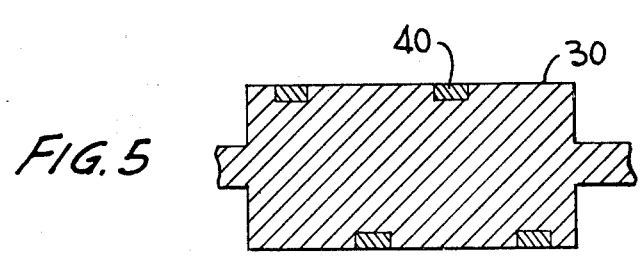
FIG. 5 is a sectional view of the helical mandrel of FIG. 4.

FIG. 5 is a sectional view of the helical mandrel of FIG. 4, and depicts the resin-impregnated carbon fiber 40 within the helical groove of the mandrel 30.

Figure 6:
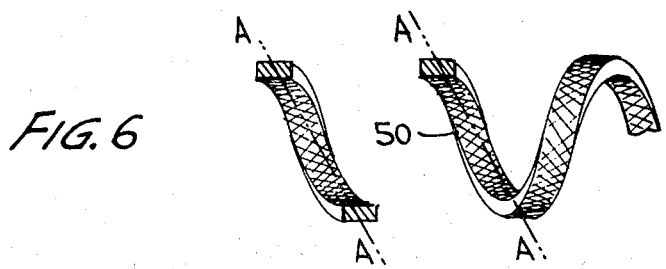
FIG. 6 is an elevational view, partially in section, of a carbon fiber reinforced composite coil spring of this invention.

FIG. 6 is an elevational and partial sectional view of a carbon fiber reinforced composite coil spring of this invention. The composite coil spring 50 is comprised of at least one layer of resin-impregnated carbon fiber braid which has been wound within the helical groove of a mandrel. Upon solidification of the resin which serves as a substantially continuous matrix material for the composite coil spring, a solid carbon fiber reinforced composite coil spring is formed. The braided carbon fibers within the composite coil spring are oriented at an angle of plus or minus 30° to plus or minus 60° to the braid axis AA within the composite coil spring 50.

The carbon fiber braid may be impregnated with the resin in any suitable manner. The impregnation step may be conducted on either a continuous or batch basis. For instance, carbon fiber braid may be continuously passed through an impregnation or coating zone wherein the resinous material is continuously applied to the carbon fiber braid. Alternatively, segments of carbon fiber braid may be impregnated while statically situated. Preferred impregnation techniques include the immersion of the braid in a resin bath. In order for sufficient impregnation of the braid to occur, it is generally necessary to impregnate the braid prior to the winding of the braid within the helical groove of a mandrel.

The resinous matrix material may comprise either a thermoplastic or a thermosetting resin, with thermosetting resins being preferred because of their increased ability to withstand elevated temperatures.

Representative thermosetting resinous materials which may be utilized in the formation of the carbon fiber reinforced composite coil spring of this invention include epoxy resins, phenolic resins, polyester resins, polimide resins, polybenzimidazoles, polyurethanes, etc. The preferred thermosetting resins are polyester resins and epoxy resins due to their torsional moduli and general temperature insensitivity.

Illustrative examples of standard trade designations of particularly useful commercially available epoxy resins include: Epi-Rez 508 and Epi-Rez 510 (Celanese Coatings), ERLA 2256 (Union Carbide), ERLA 4617 (Union Carbide), and Epon (Shell) epoxy resins.

Thermosetting resins are cured (i.e., solidified) by the application of heat and/or the use of curing agents. The curing of epoxy resins typically involves further reaction of the epoxy or hydroxyl groups to cause molecular chain growth and cross-linking. The term "curing agent" as used herein is accordingly defined to include the various hardeners of the co-reactant type. Illustrative classes of known epoxy curing agents which may be utilized include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use with the epoxy resin are acid anhydrides (e.g., hexahydrophthalic acid and methylbicyclo [2.2.1] heptene-2,2-dicarboxylic anhydride isomers marketed under the designation Nadic Methyl Anhydride by the Allied Chemical Company), and aromatic amines (e.g., metaphenylene diamine and dimethylaniline).

Representative thermoplastic resins which can be utilized in the formation of the carbon fiber reinforced composite coil spring of this invention include polyamides, polyoxymethylenes, polyolefins (e.g., polyethylene and polypropylene), thermoplastic polyesters, etc. The preferred thermoplastic resin is a polyamide (e.g., nylon 66 formed by the condensation of hexamethylene diamine with adipic acid) or a polyester (e.g., polyethylene terephthalate formed by the condensation of ethylene glycol and terephthalic acid).

The determination of whether to use a thermoplastic or a thermosetting resin as the matrix material depends in large part on the particular desired application for the carbon fiber reinforced spring. For instance, if the spring will be used under cold ambient conditions, either thermoplastic or thermosetting resins may be used. Spring rigidity will generally increase as the ambient temperature decreases.

Therefore, resins which would prove to be unsuitable under normal temperature conditions may be quite satisfactory as a matrix material under cold ambient conditions. The essential criteria for the choice of resin is that it must be able to solidify and provide a substantially continuous solid matrix under the intended conditions of use. For example, thermosetting resins would normally be used if it was anticipated that the composite coil spring would be used under conditions of excessive temperatures (e.g., 100°–1000° F.).

Thermosetting resinous material is applied to the carbon fiber braid while in a liquid consistency, and may be applied from a solvent or solvent-less system. Freely flowing dilute (i.e., highly cut) or low viscosity resin systems are preferred for ease of application.

When a solvent-less system is utilized, an A-stage thermosetting resin is preferably utilized and is maintained at a temperature of about 20° to 80° C. immediately prior to its application to the carbon fiber braid. In a particularly preferred embodiment of the invention, the A-stage thermosetting resin is maintained at a temperature of about room temperature (e.g., about 25° C.) in order to optimize its pot life or period of usefulness prior to its application to the braid.

The solvent-less system comprising an A-stage thermosetting resin is flowable and the thermosetting resin is essentially uncured (i.e., non-solid). Such resin when exposed to heat hardens or sets to a rigid solid consistency designated as C-stage thermosetting resin, and may not be subsequently rendered plastic or flowable upon the reapplication of heat. The curing or solidifying of the thermosetting resin is brought about by heat-promoted chemical changes which result in the formation of a compact, often cross-linked system. It is thus essential that a carbon fiber braid which is impregnated with such thermosetting resins be wound within the helical groove of the mandrel prior to the point in time when the curing reaction has progressed to the C-stage.

A P-stage thermosetting resin is defined as a partially cured or partially solidified thermosetting resin which has neither the consistency of a flowable liquid nor the consistency of a rigid solid. A B-stage thermosetting resin is accordingly soft and tacky in its consistency and may be readily molded. Upon the passage of time even at room temperature a B-stage thermosetting resin will assume a C-stage consistency. The conversion from a B-stage consistency to a solidified C-stage consistency is, however, accelerated or advanced by the application of heat.

The carbon fiber braid may be impregnated with an A-stage thermosetting resin, with the A-stage thermosetting resin being allowed to semi-cure such that a B-stage thermosetting resin is formed. The carbon fiber braid impregnated with the B-stage consistency thermosetting resin may then be stored under substantially non-curing conditions (e.g., low temperatures) until one wishes to make use of the resin-impregnated braid by wrapping it within the helical groove of a mandrel. The partially cured resin-impregnated braid may then be allowed to cure or solidify completely.

When the resin is applied from a solvent system, the resin is dissolved in a solvent to form a flowable liquid. Suitable solvents which are commonly utilized in such solvent systems include acetone, methyl ethyl ketone, dimethyl ketone, perchloroethylene, methylene chloride, ethylene dichloride, etc. The thermosetting resin dissolved in the solvent may be either uncured or partially cured. The solvent component will normally be removed from the resin-impregnated braid prior to its being wound within the helical groove of the mandrel. For instance, the solvent may be conveniently removed from the resin-impregnated carbon fiber braid prior to the winding step by subjecting the braid to moderate heating in order to evaporate the solvent. If it is desired to allow the solvent to remain within the impregnated braid during the solidification step upon the mandrel, it is highly desirable that portions of the braid be exposed to the atmosphere so that the solvent may escape without producing voids in the resulting composite spring.

Substantially all of the curing or solidification of the thermosetting resin may occur during or after the formation of the composite coil spring structure within the helical groove of the mandrel. If desired, the resin may contain one or more curing or solidification agents, accelerators, modifiers, or diluents of the reactive type.

Thermoplastic resins are applied to the carbon fiber braid in a liquid (i.e., molten) state. The thermoplastic resin must be maintained at a temperature above the solidification temperature of the particular resin used during the impregnation step in order that sufficient impregnation of the braid may take place. For example, the braid may be dipped within molten thermoplastic resin and then wound within a helical groove of a mandrel. The impregnated carbon fiber braid is then allowed to cool below the solidification temperature of the resin such that the thermoplastic resin solidifies and forms a substantially continuous matrix material.

The resulting carbon fiber reinforced composite coil springs are substantially void-free (preferably less than 2 percent by volume of voids) and commonly comprise 50-70 percent by volume of carbon fibers and 30 to 50 percent by weight of resinous matrix material. The composite coil springs may also contain longitudinal reinforcing fibers in the range of approximately 5 to 10 percent by volume.

Figure 7:
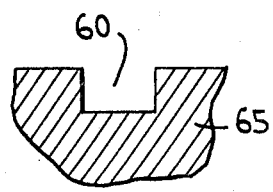
FIG. 7 shows a sectional view of the helical groove within the mandrel within which the carbon fiber braid is wound.
Figure 8:
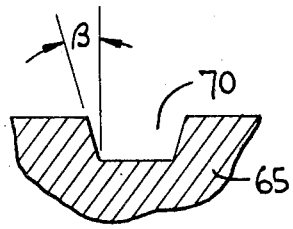
FIG. 8 shows a sectional view of an alternative helical groove within a mandrel within which the carbon fiber braid may be wound.

FIGS. 7 and 8 each show sectional views of a helical groove 60 within a mandrel 65. The helical groove may comprise any suitable cross-sectional shape. For example, the groove may be rounded, square, or rectangular in cross-section, and a square helical groove 60 has been depicted in FIG. 7. The sides of the helical groove may be bevelled or tapered for ease of removal of the composite coil spring from the helical groove 70 as shown in FIG. 8, as well as aid the insertion of the resin-impregnated braid into the groove. Normally the angle beta of the bevel or taper need only be a few degrees, preferably 1° to 3°.

The resin-impregnated carbon fiber braid may be wound or placed within a helical groove of a mandrel by any suitable method. For example, the braid may be wound within a helical groove in a continuous manner after having passed through a resin bath, or separate strips of the braid may be placed end-to-end within the groove. Continuous feeding of a length of braid from a roll is preferred, however, due to considerations of time and handling ease. In order to provide for the production of coil springs having a large diameter, the resin-impregnated braid may be layered and/or placed side-by-side within the groove prior to the solidification step so that a large composite coil spring may be formed. Longitudinal tension is preferably placed on the braid as it is wound within the helical groove and maintained during the solidification step to minimize the presence of void spaces within the solidified carbon fiber reinforced composite coil spring and provide a compact matrix structure.

Pressure is advantageously applied to the impregnated braid as it is wound within the helical groove in order to compress the layer or layers of braid and prevent the formation of void spaces and aid the solidification process. For instance, rollers may be used to compress the impregnated braid into the helical groove as the braid is wound within the groove.

For the production of small diameter carbon fiber-reinforced composite coil springs on a batch basis, the resin-impregnated braid within the helical groove may be overwrapped with several layers of tape in order to provide sufficient pressure on the outer surface of the braid during solidification. For example, an inner layer of non-porous tape (e.g., Teflon tape) overwrapped with a shrink tape (e.g., nylon tape) is sufficient to enclose the impregnated braid within a helical groove. The use of the non-porous tape prevents adhesion between the resin and the shrink tape and allows for ease of removal of the tapes upon solidification.

After solidification of the composite coil spring, the coil spring is removed from the mandrel by any suitable method. The surface of the mandrel within the helical groove may also be treated with a mold release material to facilitate removal of the solidified composite coil spring from the mandrel. Exemplary mold release materials include tetrafluroethylene, marketed by DuPont de Nemours, E. I. & Co. under the name of "Teflon", and polymeric silicone compounds.

Figure 9:
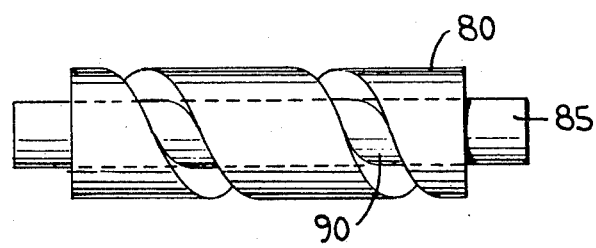
FIG. 9 shows an elevational view of a segmented mandrel which may be used to make the composite coil spring of this invention.

The solidified coil spring may be removed from the helical mandrel by various methods. The spring may be physically unwound from the mandrel. In the alternative, FIG. 9 depicts a helical mandrel 80 having a removable cylindrical core 85 whose outer surface forms the bottom inner surface of the helical groove 90. The cylindrical core 85 may be removed subsequent to solidification whereupon an arrangement of two helixes (i.e., the remaining portion of the mandrel and the solidified coil spring) remains. The two respective helixes may then be rotated in opposite directions to provide for separation.

Figure 10:
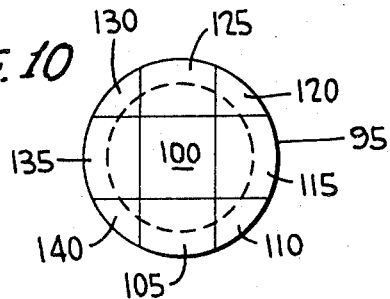
FIG. 10 shows a cross-sectional view of a collapsible mandrel which may be used to make the composite coil spring of this invention.
Figure 11:
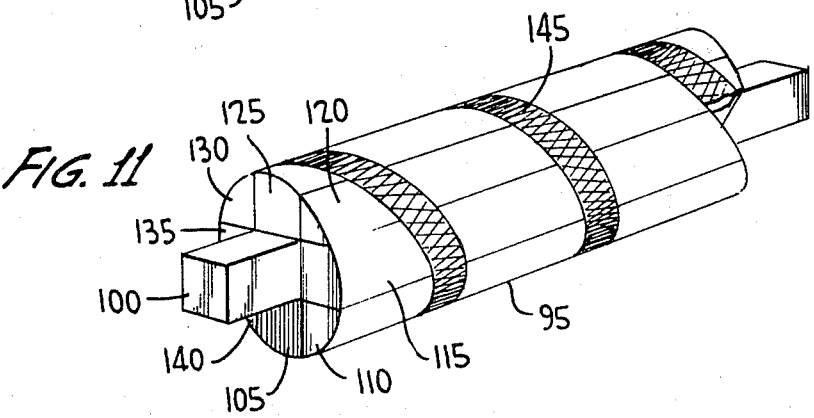
FIG. 11 shows a view in perspective view of a collapsible mandrel which may be used to make the composite coil spring of this invention.

Yet another alternative is shown by FIGS. 10 and 11 wherein a collapsible helical mandrel is depicted. The collapsible mandrel consists of a removable inner core and an outer section which further comprises several distinct pieces. Upon solidification of the composite coil spring, the inner core is removed, whereupon the separate pieces of the outer section are caused to fall inwardly and allow for the removal of the solidified coil spring.

FIG. 10 depicts a cross-sectional view of a collapsible mandrel. The mandrel 95 consists of nine distinct sections; i.e. a removable center core 100, and circumferential sections 105, 110, 115, 120, 125, 130, 135 and 140.

The collapsible mandrel is formed by cutting a solid cylinder longitudinally into the nine sections shown, and turning down the outer surface to provide a smooth, round surface. The sections are then held together while a helical groove is cut into the outer surface of the mandrel. The sections may be held together by any conventional restraining means such as metal bands or pins. The bands or pins or the like can be used to hold the respective sections of the collapsible mandrel together until the composite coil spring has solidified, at which time the restraining means are removed to allow for the disassembly of the mandrel.

The helical groove is of such a depth so as to only penetrate into the circumferential sections of the mandrel. For example, the depth of the helical groove within the mandrel 95 of FIG. 10 is depicted by the dashed line. This allows the center core 100 to be removed upon solidification of the composite coil spring within the helical groove.

After the center core section 100 is removed, opposing pairs of sections (i.e., sections 105 and 125 and sections 115 and 135) are allowed to sequentially fall into the core space vacated by the center core section 100. Finally, sections 110, 120, 130 and 140 are allowed to fall into the core space and are subsequently removed, leaving the solidified composite coil spring.

FIG. 11 depicts a view in perspective of a collapsible mandrel 95. The center core section 100 is removed upon solidification of the composite coil spring 145 within the helical groove. Circumferential sections 105, 110, 115, 120, 125, 130, 135, and 140 are then removed, leaving the solidified composite coil spring 145.

This invention is additionally illustrated in connection with the following Example which is to be considered illustrative of the present invention. It should be understood, however, that the invention is not limited to the specific details of the Example.

EXAMPLE I

A carbon fiber braid comprised of Celion 3000 ® carbon fibers is soaked in EPON 815 epoxy resin in combination with a tetraethylenetriamine (i.e., TETA) curing agent at room temperature. The excess resin is removed from the braid. The resin-impregnated braid is then wound within the helical groove of a mandrel under tension. The braid is wound within the groove three complete turns and layered three times.

The helical mandrel has an outside diameter of two inches with the groove having a depth of about one-half of an inch. The width of the groove is about 5/16 of an inch.

The ends of the braid are secured to the mandrel by taping. The braid is overwrapped with a non-porous Teflon tape under tension followed by a nylon shrink tape. The tapes are each ⅜ of an inch wide and fit over the braid and overlap onto portions of the outer surfaces of the mandrel. The mandrel is then placed into an oven for one hour at 70° C. to cure the epoxy resin. The mandrel is then removed from the oven and allowed to cool to room temperature.

The carbon fiber and the excess tape at each end of the mandrel are cut away with an end mill, and with slight end tapping, the mandrel and the spring are quickly and easily disengaged from one another by helically unwinding one from the other.

A carbon fiber coil spring with an inside diameter of approximately 1½ inches and an outside diameter of about 2 inches having two complete coils is formed. The angle of the carbon fibers within the coil spring is approximately plus or minus 40°. The composite coil spring has a shear modulus of approximately 4 million psi. The resultant coil spring has an initial spring rate of 195 lbs/inch as mesured in compression tests. The spring was compressed to a "solid height" numerous times without failure even though at the solid height the computed shearing strain of the material was beyond its elastic limit. A subsequent constant spring rate of approximately 115 lbs/inch resulted.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method for forming a carbon fiber reinforced composite coil spring comprising:
    (a) impregnating a carbon fiber braid wherein said carbon fibers are oriented at an angle in the range of approximately plus or minus 30° to plus or minus 60° to the braid axis and wherein there is incorporated into said braid a quantity of longitudinal reinforcing fibers which are oriented longitudinally to the braid axis so as to minimize change in said angle of said carbon fibers within said braid when placed under tension with a quantity of non-solidified resin to serve as a substantially continuous matrix material;
    (b) winding said impregnated braid in multiple layers while under longitudinal tension within a groove which extends helically along the surface of a cylindrical mandrel to provide the coil configuration of said carbon fiber reinforced composite coil spring;
    (c) solidifying the resinuous matrix material of the composite spring while maintaining said longitudinal tension; and
    (d) removing said solid spring from said mandrel.

2. The method of claim 1 wherein the angle of carbon fiber orientation is approximately plus or minus 45° to the braid axis.

3. The method of claim 1 wherein the longitudinal reinforcing fibers are selected from the group consisting of carbon fibers, glass fibers, aramid fibers, polyester fibers, natural fibers, and mixtures thereof.

4. The method of claim 1 wherein the quantity of longitudinal reinforcing fibers in said resulting carbon fiber reinforced composite coil spring is in the range of approximately 5 to 11 percent by volume.

5. The method of claim 1 wherein the resin is a thermosetting resin.

6. The method of claim 5 wherein the thermosetting resin is selected from the group consisting of polyester and epoxy resins.

7. The method of claim 5 wherein the quantity of thermosetting resin in said resulting carbon fiber reinforced composite coil spring is in the range of approximately 30 to 50 percent by weight.

8. The method of claim 1 wherein the shape of said groove is substantially rectangular.

9. The method of claim 1 wherein the sides of said groove are tapered to facilitate easy insertion and removal of said braid.

10. The method of claim 1 further including the step of treating the surface of said mandrel within said groove with a mold release material to facilitate the removal of the resulting carbon fiber reinforced composite coil spring from said groove after solidification.

11. The method of claim 1 wherein a collapsible mandrel is employed to facilitate the removal of said coil spring after solidification.

12. The method of claim 1 wherein said carbon fibers comprise graphitic carbon.

* * * * *